3,041,331
N-ALKANOYLBENZENESULFONYL-N'-(CYCLIC-
AMINO) UREA DERIVATIVE
John B. Wright, Kalamazoo Township, Kalamazoo
County, Mich., assignor to The Upjohn Company,
Kalamazoo, Mich., a corporation of Delaware
No Drawing. Filed Sept. 12, 1960, Ser. No. 55,151
5 Claims. (Cl. 260—239)

The present invention relates to novel N-(alkanoyl-benzenesulfonyl)-N'-(cyclicamino)ureas and more specifically relates to novel N-(alkanoylbenzenesulfonyl)-N'-(cyclicamino)urea free bases and pharmacologically acceptable acid addition salts thereof, and to oral antidiabetic compositions containing said novel compounds as active ingredients.

The novel N - (alkanoylbenzenesulfonyl) - N' - (cyclicamino)ureas of the present invention can be represented by the formula:

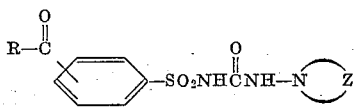

wherein R represents alkyl of 1 to 4 carbon atoms, inclusive, i.e., methyl, ethyl, propyl, isopropyl, butyl, isobutyl, and the like.

represents a saturated heterocyclic amino radical having from 5 to 9 ring atoms, inclusive, wherein Z represents a saturated bivalent radical, e.g., polymethylene, oxapolymethylene, thiapolymethylene, and azapolymethylene. The term "saturated heterocyclic amino radical" as it is employed herein includes unsubstituted saturated heterocyclic amino radicals, as well as the mono- and polyalkyl-substituted saturated heterocyclic amino radicals wherein alkyl is of 1 to 4 carbon atoms, inclusive. Representative saturated heterocyclic amino radicals within the scope of the present invention include, e.g., piperidino, morpholino, thiamorpholino, piperazino, pyrrolidino, hexamethyleneimino, heptamethyleneimino, octamethyleneimino, homomorpholino, 2-methylhexamethyleneimino, 2,2-dibutylhexamethyleneimino, 3,6-dimethylhexamethyleneimino, 2-ethylmorpholino, 2-ethyl-5-methylmorpholino, 3,3-dimethylmorpholino, 3-methylthiamorpholino, 2,3,5,6 - tetramethylthiamorpholino, 2,3,6 - trimethylthiamorpholino, 4 - butylpiperazino, 4 - isopropylpiperazino, 2,2,4,5,5-pentamethylpiperazino, 2,5-diisobutylpiperazino, 2,4,5-trimethylpiperazino, 2-methylpiperidino, 3-methylpiperidino, 4-methylpiperidino, 2-butylpiperidino, 2 - propylpiperidino, 4 - isopropylpiperidino, 3,4-diethylpiperidino, 2-sec-butylpyrrolidino, 2,2-dimethylpyrrolidino, 2-ethylpyrrolidino, 2,4-dimethylpyrrolidino, 2-isopropylpyrrolidino, hexahydro-3-isopropylpyrimidino, and the like.

The novel compounds of the present invention are orally active antidiabetic agents useful for lowering blood sugar content in mammals, especially humans, to a safe level and at dosages of the order disclosed below. In addition, the novel compounds are useful in animal feeds and animal feed supplements as set forth in U.S. Patent 2,941,884. The novel compounds are also useful as wetting, emulsifying, and waterproofing agents in the paper and leather industry.

The N - (alkanoylbenzenesulfonyl)-N'-(cyclicamino)-ureas of the present invention can be prepared by reacting an alkanoylbenzenesulfonylurethane with an N-amino saturated heterocyclic amino compound having from 5 to 9 nuclear atoms, according to the process disclosed by Marshall et al., J. Org. Chem. 23, 927, 1958, the said N-amino compound having the formula

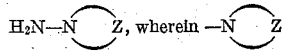

has the value noted above.

The starting alkanoylbenzenesulfonylurethanes can be prepared by reacting an alkanoylbenzenesulfonamide having the formula:

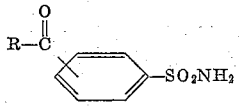

wherein R has the value noted above, with ethyl chlorocarbonate in the presence of an alkali-metal carbonate, using the process disclosed by Marshall et al., supra.

The alkanoylbenzenesulfonamides can be prepared by the process disclosed by Burton et al., J. Chem. Soc. 1949, 178. Alternatively, the alkanoylbenzenesulfonamides can be prepared by reacting an aminoalkanophenone having the formula:

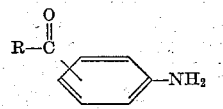

wherein R has the value noted above, with nitrous acid (produced in situ, e.g., by means of an alkali metal nitrite, such as sodium nitrite, and an acid such as hydrochloric acid); adding to the diazotized mixture a 30% solution of sulfur dioxide in acetic acid to which has been added an aqueous solution of a cupric salt such as cupric chloride, to produce the corresponding alkanoylbenzenesulfonyl chloride; and then reacting the alkanoylbenzenesulfonyl chloride with ammonia to obtain the desired alkanoylbenzenesulfonamide.

The starting N-amino saturated heterocyclic amino compounds can be prepared utilizing the process of Zimmer et al., J. Amer. Chem. Soc. 77, 790, 1955, which involves nitrosating a saturated heterocyclic amino compound having the formula

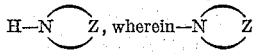

has the value noted above, with nitrous acid (produced in situ as disclosed above) and reducing the resulting N-nitroso saturated heterocyclic amino compound with lithium aluminum hydride. Other reducing agents, e.g., a mixture of zinc and acetic acid, can also be employed to reduce the N-nitroso compound. Since nitrosation of piperazine, unsubstituted in the 1 and 4 positions, can occur on both nitrogen atoms, it is generally desirable to utilize 1-benzylpiperazine as a starting compound and to debenzylate the resulting N - (alkanoylbenzenesulfonyl)-N'-(4-benzylpiperazino)urea with hydrogen in the presence of a palladium catalyst according to the process disclosed in U.S. Patent 2,415,786. The reduction of the N-nitroso compound with lithium aluminum hydride is highly exothermic in many instances. Accordingly, it is good practice to bring the reactants together gradually, such as by gradual addition of a solution of the N-nitroso compound in an inert solvent to the reaction mixture containing the lithium aluminum hydride.

Pharmacologically acceptable acid addition salts of the present invention can be prepared from the N-(alkanoylbenzenesulfonyl)-N'-(cyclicamino)urea free bases by conventional methods. For example, the free base can be dissolved in an aqueous solution of the appropriate acid and the salt can be isolated by evaporation of the solution. Alternatively, the free base dissolved in an organic solvent such as methanol, ethanol, ethyl acetate, ether, and the like, can be treated with the appropriate acid and according to the nature of the solvent employed the desired salt will separate spontaneously or can be precipitated by the addition of a solvent in which the salt is insoluble. Suitable acids include hydrochloric, sulfuric, hydrobromic, phosphoric, tartaric, acetic, citric, succinic, maleic, benzoic, salicylic, and the like.

The following examples are illustrative of the products of the present invention, but are not to be construed as limiting.

*Example 1.—N-(4-Acetylbenzenesulfonyl)-N'- Hexamethyleniminourea*

(A) 4-acetylbenzenesulfonyl chloride: To 13.52 g. (0.1 mole) of p-aminoacetophenone (Beilstein's Handbuch der Organischen Chemie, 4th edition, vol. 14, p. 46) was added 100 ml. of acetic acid and 34 ml. of concentrated hydrochloric acid. The resulting suspension was cooled to about 0° C. and to this was added dropwise a solution of 7.59 g. of sodium nitrite in 12 ml. of water. The slightly turbid yellow solution was stirred for ½ hour at about 0° C. and then 80 ml. of a 30% sulfur dioxide solution in acetic acid, to which had been added a solution containing 4 g. of cupric chloride dihydrate dissolved in 7 ml. of water, was added. The mixture was allowed to warm to about 25° C., poured into ice water, filtered, and the filter cake was washed with water. The resulting 4-acetylbenzenesulfonyl chloride melted at 87–89° C.

(B) 4-acetylbenzenesulfonamide: The 4-acetylbenzenesulfonyl chloride of Part A was added to 70 ml. of concentrated ammonium hydroxide solution, whereupon an exothermic reaction occurred. After standing for about 12 hours the mixture was filtered, washed with water, and the recovered solid was recrystallized from ethanol. The product, 4 - acetylbenzenesulfonamide, weighed 10.92 g. and melted at 176–178° C.

(C) 4-acetylbenzenesulfonylurethane: To a stirred mixture of 19.9 g. (0.1 mole) of 4-acetylbenzenesulfonamide, 36.0 g. of finely ground anhydrous potassium carbonate, and 120 ml. of acetone was added 14.26 g. (0.132 mole) of ethyl chlorocarbonate. The reaction mixture was stirred at reflux temperature for 2.5 hours, cooled, and 20 ml. of acetone was added. The resulting solid was recovered by filtration, pressed dry, and stirred with 500 ml. of water for 15 minutes. The mixture was filtered, and the clear filtrate was acidified with 30 ml. of concentrated hydrochloric acid, with cooling. The resulting precipitate was recovered by filtration, washed with water, and air dried. There was thus obtained 16.49 g. (61%) of 4-acetylbenzenesulfonylurethane which melted at 128–130° C. An analytical sample prepared by recrystallization from benzene melted at 128.5–130.5° C.

*Analysis.*—Calcd. for $C_{11}H_{13}NO_5S$: C, 48.70; H, 4.83; N, 5.16; S, 11.82. Found: C, 48.56; H, 5.02; N, 5.11; S, 11.91.

(D) 1-nitrosohexamethyleneimine: A solution of 89.5 g. of hexamethyleneimine, 75 ml. of concentrated hydrochloric acid, and 26 ml. of water was heated to 70° C. on a steam bath. The solution was made acidic by adding 5 ml. of 2 N hydrochloric acid. While maintaining the reaction mixture at 70–75° C., a solution of 67 g. of sodium nitrite in 95 ml. of water was added with stirring over a period of 1 hour. The mixture was then stirred at 70° C. for 2 hours, and then cooled. The upper oily layer was separated and the aqueous layer was then extracted with ether. The combined ether extract and oil was dried over anhydrous magnesium sulfate and concentrated to dryness. Upon distillation of the residue there was obtained 1-nitrosohexamethyleneimine as a yellow oil boiling at 136–138° C./34 mm.

(E) 1-aminohexamethyleneimine: To a mixture of 15.18 g. of lithium aluminum hydride and 400 ml. of anhydrous ether was added about 10% of a solution of 51.27 g. of 1-nitrosohexamethyleneimine in 100 ml. of anhydrous ether. The mixture was refluxed until the reaction started. The remainder of the solution was added at such a rate as to maintain gentle reflux. Refluxing was continued for 2 hours more, followed by the successive addition of 16 ml. of water, 12 ml. of 20% aqueous sodium hydroxide solution, and 56 ml. of water. The inorganic precipitate was removed by filtration and washed with ether. The filtrate and ether washes were dried and the ether was removed by evaporation. Upon distillation of the residue there was obtained 25.46 g. (56%) of 1-aminohexamethyleneimine as a colorless liquid boiling at 94–96° C./55 mm.

In the same manner as shown in Parts D and E, the following N-amino saturated heterocyclic amines were prepared by substituting the corresponding secondary heterocyclic amine having the formula

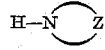

shown above, for hexamethyleneimine: 1-aminopiperidine, 1-amino-4-methylpiperazine, 1-amino-3,6-dimethylhexamethyleneimine, 1 - amino-2,2-dibutylhexamethyleneimine, 1-amino-4-methylhexamethyleneimine, 1-aminoheptamethyleneimine, 1 - aminooctamethyleneimine, 4 - aminomorpholine, 4-amino-2-ethylmorpholine, 4-amino-3,5 - dimethylmorpholine, 4 - aminohomomorpholine, 4-aminothiamorpholine, 4-amino-2,3,5-trimethylthiamorpholine, 4-amino-2,6-dimethylthiamorpholine, 1-amino-2-butylpiperidine, 1-amino - 5 - ethyl-2-methylpiperidine, 1 - amino - 4 - isopropylpiperidine, 1-aminopyrrolidine, 1 - amino-2-butyl-5-methylpyrrolidine, 1-amino-2,5-diisopropylpyrrolidine, 1-amino-4-butylpiperazine, 1-amino-4-isopropylpiperazine, and 1-amino-2,4,5-trimethylpiperazine.

(F) N - (4-acetylbenzenesulfonyl)-N'-hexamethyleneiminourea free base: A mixture of 11.4 g. of 1-aminohexamethyleneimine and 25.5 g. of 4-acetylbenzenesulfonylurethane was heated at 130° C. (oil bath temperature) for 2 hours. The resulting ethanol and unreacted amine were removed at 100 mm. pressure for 1 hour and at 20 mm. for 2 hours while keeping the oil bath at 130° C. The residue was cooled and recrystallized from methyl ethyl ketone, giving N-(4-acetylbenzenesulfonyl)-N'-hexamethyleneiminourea free base.

(G) N - (4-acetylbenzenesulfonyl)-N'-hexamethyleneiminourea hydrochloride: N-(4-acetylbenzenesulfonyl)-N'-hexamethyleneiminourea free base was dissolved in ether and gaseous hydrogen chloride was added thereto to produce N-(4-acetylbenzenesulfonyl)-N'-hexamethyleneiminourea hydrochloride.

*Example 2.—N-(4-Propionylbenzenesulfonyl)-N'- Piperidinourea*

(A) 4-propionylbenzenesulfonylurethane: In the same manner as shown in Example 1, Parts A, B, and C, 4-propionylbenzenesulfonylurethane was prepared by using p-aminopropiophenone (Beilstein's Handbuch der Organischen Chemie, 4th edition, vol. 14, p. 59) instead of p-aminoacetophenone.

(B) N-(4-propionylbenzenesulfonyl) - N' - piperidinourea free base: In the same manner as shown in Example 1, Part F, N-(4-propionylbenzenesulfonyl)-N'-piperidinourea free base was prepared by using 4-propionylbenzenesulfonylurethane and 1-aminopiperidine instead of 4-acetylbenzenesulfonylurethane and 1-aminohexamethyleneimine.

(C) N - (4-propionylbenzenesulfonyl)-N'-piperidinourea citrate: In the same manner as shown in Example 1, Part G, N-(4-propionylbenzenesulfonyl)-N'-piperidinourea citrate was prepared by using N-(4-propionylbenzenesulfonyl)-N'-piperidinourea free base and citric acid instead of N-(4-acetylbenzenesulfonyl)-N'-hexamethyleneiminourea free base and hydrogen chloride.

*Example 3.—N - (4 - butylrylbenzenesulfonyl) . N' - (4-Methylpiperazino)urea*

(A) 4-butyrylbendenesulfonylurethane: In the same manner as shown in Example 1, Parts A, B, and C, 4-butyrylbenzenesulfonylurethane was prepared by using p-amino-butyrophenone (Beilstein's Handbuch der Organischen Chemie, 4th edition, vol. 14, p. 65) instead of p-aminoacetophenone.

(B) N - (4 - butyrylbenzenesulfonyl) - N' - (4 - methylpiperazino)urea free base: In the same manner as shown in Example 1, Part F, N-(4-butyrylbenzenesulfonyl)-N'-(4-methylpiperazino)urea free base was prepared by using 4-butyrylbenzenesulfonylurethane and 1-amino-4-methylpiperazine instead of 4-acetylbenzenesulfonylurethane and 1-aminohexamethyleneimine.

(C) N - (4 - butyrylbenzenesulfonyl) - N' - (4 -methylpiperazino)urea sulfate: In the same manner as shown in Example 1, Part G, N-(4-butyrylbenzenesulfonyl)-N'-(4-methylpiperazino)urea sulfate was prepared by using N - (4 - butyrylbenzenesulfonyl) - N' - (4 - methylpiperazino)urea free base and sulfuric acid instead of N-(4-acetylbenzenesulfonyl) - N' - hexamethyleneiminourea free base and hydrogen chloride.

*Example 4.—N-(4-Isobutyrylbenzenesulfonyl)-N'-Heptamethyleneiminourea*

(A) 4-isobutyrylbenzenesulfonylurethane: In the same manner as shown in Example 1, Parts A, B, and C, 4-isobutyrylbenzenesulfonylurethane was prepared by using p-aminoisobutyrophenone instead of p-aminoacetophenone.

(B) N - (4 -isobutyrylbenzesulfonyl) - N' - heptamethyleneiminourea free base: In the same manner as shown in Example 1, Part F, N-(4-isobutyrylbenzenesulfonyl)-N'-heptamethyleneiminourea free base was prepared by using 4-isobutyrylbenzenesulfonylurethane and 1-aminoheptamethyleneimine instead of 4-acetylbenzenesulfonylurethane and 1-aminohexamethyleneimine.

(C) N - (4 - isobutyrylbenzenesulfonyl) - N' - heptamethyleneiminourea hydrochloride: In the same manner as shown in Example 1, Part G, N-(4-isobutyrylbenzenesulfonyl) - N' - heptamethyleneiminourea hydrochloride was prepared by using N-(4-isobutyrylbenzenesulfonyl)-N'-heptamethyleneiminourea free base instead of N-(4-acetylbenzenesulfonyl)-N'-hexamethyleneiminourea free base.

*Example 5.—N - (4 - Propionylbenzenesulfonyl) - N' -(3, 6-Dimethylhexamethyleneimino)urea*

(A) N - (4 - propionylbenzenesulfonyl) - N' - (3,6-dimethylhexamethyleneimino)urea free base: In the same manner as shown in Example 1, Part F, N-(4-propionylbenzenesulfonyl) - N' - (3,6 - dimethylhexamethyleneimino)urea free base was prepared by using 4-propionylbenzenesulfonylurethane and 1-amino-3,6-dimethylhexamethyleneimine instead of 4-acetylbenzenesulfonylurethane and 1-aminohexamethyleneimine.

(B) N - (4 - propionylbenzenesulfonyl) - N' - (3,6 - dimethylhexamethyleneimino)urea tartrate: In the same manner as shown in Example 1, Part G, N-(4-propionylbenzenesulfonyl) - N' - (3,6 - dimethylhexamethyleneimino)urea tartrate was prepared by using N-(4-propionylbenzenesulfonyl) - N' - (3,6 - dimethylhexamethyleneimino)urea free base and tartaric acid instead of N-(4-acetylbenzenesulfonyl)-N'-hexamethyleneiminourea free base and hydrogen chloride.

*Example 6.—N - (4 - Acetylbenzenesulfonyl) - N' - Octamethyleneiminourea*

(A) N - (4 - acetylbenzenesulfonyl) - N' - octamethyleneiminourea free base: In the same manner as shown in Example 1, Part F, N-(4-acetylbenzenesulfonyl)-N'-octamethyleneiminourea free base was prepared by using 1-aminoöctamethyleneimine instead of 1-aminohexamethyleneimine.

(B) N - (4 - acetylbenzenesulfonyl) - N' - octamethyleneiminourea hydrochloride: In the same manner as shown in Example 1, Part G, N-(4-acetylbenzenesulfonyl)-N'-octamethyleneiminourea hydrochloride was prepared by using N-(4-acetylbenzenesulfonyl)-N'-octamethyleneiminourea free base instead of N-(4-acetylbenzenesulfonyl)-N'-hexamethyleneiminourea free base.

*Example 7.—N - (4 - Propionylbenzenesulfonyl) - N'-Morpholinourea*

(A) N - (4 - propionylbenzenesulfonyl) - N' - morpholinourea free base: In the same manner as shown in Example 1, Part F, N-(4-propionylbenzenesulfonyl)-N'-morpholinourea free base was prepared by using 4-propionylbenzenesulfonylurethane and 4-aminomorpholine instead of 4-acetylbenzenesulfonylurethane and 1-aminohexamethyleneimine.

(B) N - (4 - propionylbenzenesulfonyl) - N' - morpholinourea maleate: In the same manner as shown in Example 1, Part G, N-(4-propionylbenzenesulfonyl)-N'-morpholinourea maleate was prepared by using N-(4-propionlybenzenesulfonyl)-N'-morpholinourea free base and maleic acid instead of N-(4-acetylbenzenesulfonyl)-N'-hexamethyleneiminourea free base and hydrogen chloride.

*Example 8.—N - (4 - Propionylbenzenesulfonyl) - N' - (2-Ethylmorpholino)Urea Free Base*

In the same manner as shown in Example 1, Part F, N-(4 - propionylbenzenesulfonyl) - N' - (2 - ethylmorpholino)urea free base was prepared by using 4-propionylbenzenesulfonylurethane and 4-amino-2-ethylmorpholine instead of 4-acetylbenzenesulfonylurethane and 1-aminohexamethyleneimine.

*Example 9.—N - (Butyrylbenzenesulfonyl) - N' - Homomorpholinourea*

(A) N - (4 - butyrylbenzenesulfonyl) - N' - homomorpholinourea free base: In the same manner as shown in Example 1, Part F, N-(4-butyrylbenzenesulfonyl)-N'-homomorpholinourea free base was prepared by using 4-butyrylbenzenesulfonylurethane and 4-aminohomomorpholine instead of 4-acetylbenzenesulfonylurethane and 1-aminohexamethyleneimine.

(B) N - (4 - butyrylbenzenesulfonyl) - N' - homomorpholinourea hydrobromide: In the same manner as shown in Example 1, Part G, N-(4-butyrylbenzenesulfonyl)-N'-homomorpholinourea hydrobromide was prepared by using N -(4 - butyrylbenzenesulfonyl) - N' - homomorpholinourea free base and hydrogen bromide instead of N - (4 - acethylbenzenesulfonyl) - N' - hexamethyleneiminourea free base and hydrogen chloride.

*Example 10.—N - (3 - Isobutyrylbenzenesulfonyl) - N'-Thiamorpholinourea*

(A) N - (3 - isobutyrylbenzenesulfonyl) - N' - thiamorpholinourea free base: In the same manner as shown in Example 1, Part F, N-(3-isobutyrylbenzenesulfonyl)-N'-thiamorpholinourea free base was prepared by using 3-isobutyrylbenzenesulfonylurethane and 4-aminothiamorpholine instead of 4-acetylbenzenesulfonylurethane and 1-aminohexamethyleneimine.

(B) N - (3 - isobutyrylbenzenesulfonyl) - N' - thiamorpholinourea phosphate: In the same manner as shown in Example 1, Part G, N-(3-isobutyrylbenzenesulfonyl)-N'-thiamorpholinourea phosphate was prepared by using N - (3 - isobutyrylbenzenesulfonyl) - N' - thiamorpholinourea free base and phosphoric acid instead of N-(4-acetylbenzenesulfonyl) - N' - hexamethyleneiminourea and hydrogen chloride.

*Example 11.—N-(4-Acetylbenzenesulfonyl)-N'-(2,3,5-Trimethylthiamorpholino)Urea Free Base*

In the same manner as shown in Example 1, Part F,

N - (4 - acetylbenzenesulfonyl) - N' - (2,3,5 - trimethylthiamorpholino)urea free base was prepared by using 4-amino-2,3,5-trimethylthiamorpholine instead of 1-aminohexamethyleneimine.

*Example 12.—N-(4-Propionylbenzenesulfonyl)-N'-(2-Butylpiperidino)Urea Free Base*

In the same manner as shown in Example 1, Part F, N - (4 - propionylbenzenesulfonyl) - N' - (2 - butylpiperidino)urea free base was prepared by using 4-propionylbenzenesulfonylurethane and 1-amino-2-butylpiperidine instead of 4-acetylbenzenesulfonylurethane and 1-aminohexamethyleneimine.

*Example 13.—N-(3-Propionylbenzenesulfonyl)-N'-(2-Butyl-5-Methylpyrrolidino)Urea Free Base*

In the same manner as shown in Example 1, Part F, N - (3 - propionylbenzenesulfonyl) - N' - (2 - butyl - 5-methylpyrrolidino)urea free base was prepared by using 3-propionylbenzenesulfonylurethane and 1-amino-2-butyl-5-methylpyrrolidine instead of 4-acetylbenzenesulfonylurethane and 1-aminohexamethyleneimine.

*Example 14.—N-(2-Butyrylbenzenesulfonyl)-N'-Pyrrolidinourea*

(A) N - (2 - butyrylbenzenesulfonyl) - N' - pyrrolidinourea free base: In the same manner as shown in Example 1, Part F, N-(2-butyrylbenzenesulfonyl)-N'-pyrrolidinourea free base was prepared by using 2-butyrylbenzenesulfonylurethane and 1-aminopyrrolidine instead of 4-acetylbenzenesulfonylurethane and 1-aminohexamethyleneimine.

(B) N - (2 - butyrylbenzenesulfonyl) - N' - pyrrolidinourea salicylate: In the same manner as shown in Example 1, Part G, N-(2-butyrylbenzenesulfonyl)-N'-pyrrolidinourea salicylate was prepared by using N-(2-butyrylbenzenesulfonyl)-N'-pyrrolidinourea free base and salicylic acid instead of N-(4-acetylbenzenesulfonyl)-N'-hexamethyleneiminourea free base and hydrogen chloride.

*Example 15.—N-(2-Propionylbenzenesulfonyl)-N'-(4-Butylpiperazino)Urea Free Base*

In the same manner as shown in Example 1, Part F, N - (2 - propionylbenzenesulfonyl) - N' - (4 - butylpiperazino)urea free base was prepared by using 2-propionylbenzenesulfonylurethane and 1-amino-4-butylpiperazine instead of 4-acetylbenzenesulfonylurethane and 1-aminohexamethyleneimine.

*Example 16.—N-(3-Propionylbenzenesulfonyl)-N'-Piperazinourea*

(A) 1-amino-4-benzylpiperazine: In the same manner as shown in Example 1, Parts D and E, 1-amino-4-benzylpiperazine was prepared by using 4-benzylpiperazine (U.S. Patent 2,415,785) instead of hexamethyleneimine.

(B) N - (3 - propionylbenzenesulfonyl) - N' - (4-benzylpiperazino)urea free base: In the same manner as shown in Example 1, Part F, N-(3-propionylbenzenesulfonyl)-N'-(4-benzylpiperazino)urea free base was prepared by using 3-propionylbenzenesulfonylurethane and 1-amino-4-benzylpiperazine instead of 4-acetylbenzenesulfonylurethane and 1-aminohexamethyleneimine.

(C) N - (3 - propionylbenzenesulfonyl) - N' - piperazinourea free base: In the same manner as shown in U.S. Patent 2,415,786, N-(3-propionylbenzenesulfonyl)-N'-piperazinourea free base was prepared by debenzylating N - (3 - propionylbenzenesulfonyl) - N' - (4 - benzylpiperazino)urea free base with hydrogen in the presence of palladium-on-charcoal catalyst.

(D) N - (3 - propionylbenzenesulfonyl) - N' - piperazinourea tartrate: In the same manner as shown in Example 1, Part G, N-(3-propionylbenzenesulfonyl)-N'-piperazinourea tartrate was prepared by using N-(3-propionylbenzenesulfonyl)-N'-piperazinourea free base and tartaric acid instead of N-(4-acetylbenzenesulfonyl)-N'-hexamethyleneiminourea free base and hydrogen chloride.

*Example 17.—N-(4-Valerylbenzenesulfonyl)-N'-Hexamethyleneiminourea*

(A) 4-valerylbenzenesulfonylurethane: In the same manner as shown in Example 1, Parts A, B, and C, 4-valerylbenzenesulfonylurethane was prepared by using p-aminovalerophenone (Sugimoto et al., J. Pharm. Soc. Japan 71, 1161, 1951; C.A. 46,5011, 1952) instead of p-aminoacetophenone.

(B) N - (4 - valerylbenzenesulfonyl) - N' - hexamethyleneiminourea free base: In the same manner as shown in Example 1, Part F, N-(4-valerylbenzenesulfonyl)-N'-hexamethyleneiminourea free base was prepared by using 4-valerylbenzenesulfonylurethane instead of 4-acetylbenzenesulfonylurethane.

(C) N - (4 - valerylbenzenesulfonyl) - N' - hexamethyleneiminourea hydrochloride: In the same manner as shown in Example 1, Part G, N-(4-valerylbenzenesulfonyl)-N'-hexamethyleneiminourea hydrochloride was prepared by using N-(4-valerylbenzenesulfonyl)-N'-hexamethyleneiminourea free base instead of N-(4-acetylbenzenesulfonyl)-N'-hexamethyleneiminourea free base.

As indicated hereinbefore the compounds of the present invention are useful for the treatment of diabetes perorally and for this purpose the active compounds are associated with a pharmaceutically acceptable carrier.

For such oral administration the active compounds can be administered in liquid or solid dosage form. Solid forms include capsules, tablets, powders, pills, and the like, and liquid forms include suitably flavored aqueous suspensions and solutions (depending on concentration desired), and flavored oil suspensions and solutions wherein edible oils such as corn oil, cottonseed oil, coconut oil, peanut oil, sesame oil, or mixtures of these, and the like can be employed.

For preparing compositions such as tablets and other compressed formulations the composition can include any compatible and edible tableting material used in pharmaceutical practice such as corn starch, lactose, dibasic calcium phosphate, stearic acid, magnesium stearate, talc, methyl cellulose, and the like.

Similarly, the compounds of the present invention can be mixed with suitable adjuvants for the preparation of resorbable hard gelatin or soft capsules utilizing conventional pharmaceutical practices.

The following illustrative compositions are within the scope of the present invention:

(1) HARD GELATIN CAPSULES 10,000 two-piece hard gelatin capsules for oral use, each containing 200 milligrams of N-(4-acetylbenzenesulfonyl)-N'-hexamethyleneiminourea free base are prepared from the following amounts and types of materials:

| | Gm. |
|---|---|
| N - (4 - acetylbenzenesulfonyl) - N' - hexamethyleneiminourea free base | 2000 |
| Corn starch | 1616 |
| Mineral oil, U.S.P. | 129.6 |
| Magnesium stearate, powder | 162 |
| Talc, U.S.P. | 162 |

The finely powdered N-(4-acetylbenzenesulfonyl)-N'-hexamethyleneimino free base is mixed thoroughly with the rest of the ingredients and then capsulated.

(2) SOFT ELASTIC CAPSULES

One-piece soft elastic capsules for oral use, each containing 100 milligrams of N-(4-acetylbenzenesulfonyl)-N'-hexamethyleneiminourea free base are prepared in the usual manner by first dispersing the active ingredient in sufficient corn oil to render the material capsulatable.

(3) OIL SUSPENSION

An oil suspension for oral use, containing in each 5 milliliters 500 milligrams of N-(4-acetylbenzenesulfonyl)-

N'-hexamethyleneiminourea free base is prepared from the following types and amounts of materials:

| | |
|---|---|
| Sweetening agent | gm 3.5 |
| N-(4-acetylbenzenesulfonyl)-N'-hexamethyleneiminourea free base | gm 1000 |
| Preservative | gm 20 |
| Antioxidant | gm 1 |
| Flavoring | ml 25 |

Aluminum monostearate-corn oil gel to make 10,000 ml.

(4) TABLET 10,000 oral tablets each containing 250 milligrams of N-(4-pripionylbenzenesulfonyl)-N'-piperidinourea free base are prepared from the following types and amounts of materials:

| | Gm. |
|---|---|
| N-(4-propionylbenzenesulfonyl)-N'-piperidinourea free base | 2500 |
| Dicalcium phosphate | 3050 |
| Methylcellulose, U.S.P. (15 cps.) | 65 |
| Talc, bolted | 450 |
| Calcium stearate, fine powder | 35 |

The ingredients are mixed in a conventional manner and compressed into tablets, each containing 250 mg. of active ingredient.

(5) SYRUP

A sugar-free syrup for oral use containing in each 5 milliliters 250 milligrams of N-(4-butyrylbenzenesulfonyl)-N'-(4-methylpiperazino)urea sulfate is prepared from the following types and amounts of materials:

| | |
|---|---|
| N-(4-butyrylbenzenesulfonyl)-N'-(4-methylpiperazino)urea sulfate | gm 500 |
| Methylparaben U.S.P. | gm 3 |
| Sorbic acid | gm 3 |
| Sweetening agent | gm 18 |
| Flavoring | ml 3 |
| Glycerin | ml 1500 |

Deionized water to make 10,000 ml.

A dose of 1 teaspoonful (5 ml.) to 1 tablespoonful (15 ml.) will give the patent 250 to 750 mg. of N-(4-butyrylbenzenesulfonyl)-N'-(4-methylpiperazino)urea sulfate.

The dosage of the novel compounds of the present invention for the treatment of diabetes depends on the age, weight, and condition of the patient being treated. Generally speaking for adult oral administration the preferred unit dosage is 100 to 500 mg. of active compound with a suitable pharmaceutical diluent and/or lubricant. One or two unit dosages are given one to four times a day. A total daily dose of from 100 to 1500 mg. given singly but preferably in divided doses, embraces the effective range for the treatment of diabetes.

In addition to the foregoing principal active ingredients, the present compositions can also include, as supplementary active ingredients, other blood sugar lowering compounds, such as tolbutamide, chlorpropamide and phenformin. Such supplementary active ingredients can be included in these compositions in amounts approximately equal to or less than the concentrations employed where such materials are the sole active ingredients.

I claim:
1. A compound selected from the group consisting of (1) N-alkanoylbenzenesulfonyl - N' - (cyclicamino)urea free bases having the formula:

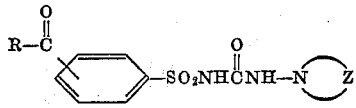

wherein R is alkyl of 1 to 4 carbon atoms, inclusive, and

is saturated heterocyclic amino selected from the group consisting of unsubstituted and mono- and polyalkyl substituted piperidino, morpholino, thiamorpholino, piperazino, pyrrolidino, hexamethyleneimino, heptamethyleneimino, octamethyleneimino, and homomorpholino, wherein each alkyl is of 1 to 4 carbon atoms, and (2) pharmacologically acceptable acid addition salts thereof.

2. A compound having the formula:

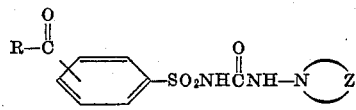

wherein R is alkyl of 1 to 4 carbon atoms, inclusive, and

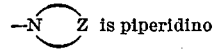 is piperidino

3. A compound having the formula:

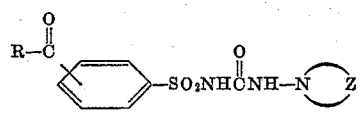

wherein R is an alkyl of 1 to 4 carbon atoms, inclusive, and

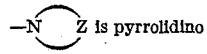 is pyrrolidino

4. A compound having the formula:

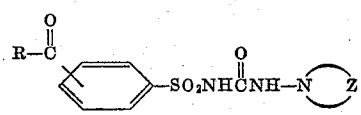

wherein R is alkyl of 1 to 4 carbon atoms, inclusive, and

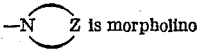 is morpholino

5. A compound having the formula:

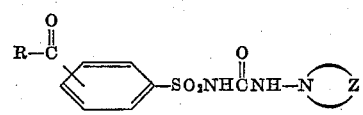

wherein R is alkyl of 1 to 4 carbon atoms, inclusive, and

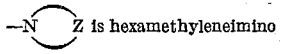 is hexamethyleneimino

No references cited.